(12) United States Patent
Perkins

(10) Patent No.: US 6,614,889 B2
(45) Date of Patent: Sep. 2, 2003

(54) SOFTWARE CONTROLLED SWITCH DEVICE

(75) Inventor: John Leslie Perkins, St Kilda (AU)

(73) Assignee: Exfax Technologies Pty. Ltd., St Kilda (AU)

(*) Notice: Subject to any disclaimer, the term of this patent is extended or adjusted under 35 U.S.C. 154(b) by 306 days.

(21) Appl. No.: 09/837,965

(22) Filed: Apr. 19, 2001

(65) Prior Publication Data
US 2001/0046281 A1 Nov. 29, 2001

(30) Foreign Application Priority Data
Apr. 20, 2000 (AU) .............................. PQ 7032

(51) Int. Cl.⁷ ............................................. H04M 11/00
(52) U.S. Cl. ................... 379/93.09; 379/100.15
(58) Field of Search .................... 379/93.09, 93.11, 379/93.05, 100.15, 100.16

(56) References Cited

U.S. PATENT DOCUMENTS

| | | |
|---|---|---|
| 4,652,933 A | 3/1987 | Koshiishi |
| 4,802,204 A | 1/1989 | Chang |
| 4,802,893 A | 2/1989 | Wollenberg et al. |
| 4,816,911 A | 3/1989 | Kirsch et al. |
| 4,827,349 A | 5/1989 | Ogata et al. |
| 4,850,008 A | 7/1989 | Berg et al. |
| 4,910,506 A | 3/1990 | Yoshida et al. |
| 4,910,607 A | 3/1990 | Kita et al. |
| 4,914,688 A | 4/1990 | Kobayashi et al. |
| 4,964,154 A | 10/1990 | Shimotono |
| 4,991,200 A | 2/1991 | Lin |
| 5,020,096 A | 5/1991 | Sakakibara et al. |
| 5,528,385 A | 6/1996 | Manning ............... 379/100.15 |
| 5,696,600 A | 12/1997 | Perkins ................. 379/100.15 |
| 5,790,640 A | 8/1998 | Tassa et al. ............ 379/100.15 |
| 5,949,858 A | 9/1999 | Remensperger ........ 379/100.15 |

FOREIGN PATENT DOCUMENTS

| | | |
|---|---|---|
| AU | 4070385 | 10/1985 |
| DE | 3732533 | 4/1989 |
| EP | 212199 | 3/1987 |
| EP | 0291307 | 11/1988 |
| EP | 0426412 | 10/1990 |
| GB | 2210234 | 6/1989 |
| GB | 2214032 | 8/1989 |
| WO | 9010989 | 9/1990 |

OTHER PUBLICATIONS

Abstract for Japanese Patent No. 59224964, Inventor: Suga Yukio et al.; Published Dec. 17, 1984.
Abstract for Japanese Application No. 62327901, Inventor: Sumita Kazuyuki; Published Jul. 3, 1989.
Abstract for Japanese Application No. 62327902, Inventor: Sumita Kazuyuki; Published Jul. 3, 1989.
Abstract for European Patent No. 212199, Inventor: Kurt Heine; Published Mar. 4, 1987.

*Primary Examiner*—Stella Woo
(74) *Attorney, Agent, or Firm*—Killworth, Gottman, Hagan & Schaeff, LLP

(57) ABSTRACT

A switching device and software therefor are provided to permit two devices connected to the switching device to be interconnected into four different interconnected modes of operation. The devices may be intended for parallel output COM port connection with the computer and the device is controlled from the serial output COM port of the computer using control lines of the serial output COM port to provide switch signals on two of those output lines to, in turn, provide four switching signals for the respective four possible interconnected modes of operation.

24 Claims, 3 Drawing Sheets

SOFTWARE CONTROLLED SWITCH DEVICE

FIELD OF THE INVENTION

This invention relates to a software controlled switch device and that permits two interconnected devices to be connected into four possible interconnected modes of operation. The switching device preferably connects with the serial output COM port and uses control line signals on the serial output COM port to selectively operate the switch means to, in turn, provide the four possible modes of interconnected operation of the devices.

BACKGROUND OF THE INVENTION

In the prior art of computer controlled switching and sensing equipment, devices have been directly controlled via the PC parallel data bus or indirectly controlled via an external cable connection. Devices may also be directly controlled via a specialist interface on the bus, or indirectly via a printer or communications port.

Directly controlled devices may operate by a parallel interface, that is, by reading or writing data to certain machine addresses in the address and data busses of the computer. The presence or absence of certain data on the busses is used to control switches. Such devices do not operate with a standard memory address or standard method by which the computer may recognise the equipment. In other words, the set-up is dedicated for the particular devices and computer. This, in turn, has not facilitated the writing of software for "Plug and Play" compatibility.

It has been known to provide switching devices which connect a fax machine, a computer, and a modem to a telephone line but such devices themselves have not been universal and require dedicated set-up. In some cases switch means are provided within a modem, and controlled via the modem and a microprocessor of the modem. In this case it is typical to provide an AT command issued to the modem via the serial output COM port of the computer. In this case, to achieve the desired switching features it is necessary for the user to acquire a special purpose modem to connect to the fax machine and the computer. In other words, dedicated devices must be provided at the outset and there is no universal switching device which will permit interconnection of single purposes devices such as dedicated fax and a dedicated standard modem without the use of dedicated hardware and control circuits and the like in the modem.

Todate there is no general switching device which will permit a computer to interconnect with two devices connected to the switching device to permit different interconnected modes of operation of the devices in a universally adaptable way without the use of dedicated circuitry in the devices themselves.

OBJECT AND STATEMENT OF THE INVENTION

It is an object of the invention to attempt to provide a software controlled switch device that will permit devices to be controlled by a computer for particular interconnected modes of operation without the need for dedicated hardware in the devices themselves. In a particular implementation, the switching device is controlled by control signals that issue from a serial output COM port of a PC. In this way, devices intended for connection with the PC via an output port can be controlled for interconnected modes of operation.

In accordance with the first broad aspect of the present invention there maybe provided a method of using a computer and a switching device to switch two devices connected to said switching device into different interconnected modes of operation, said method involving:

a) providing software in the computer permitting interface to request different interconnected modes of operation of said two devices, b) causing a first switching signal to be generated by said software in response to a request for one particular interconnected mode of operation, c) receiving that first switching signal at said switching device and controlling two switch means in said switching device with said first switching signal to provide one of four possible interconnected modes of operation of said two devices, each of said two switch means having respective ON and OFF states, whereby providing a second switching signal will provide a second possible interconnected mode of operation, providing a third switching signal will provide a third possible interconnected mode of operation, and providing a fourth switching signal will provide a fourth possible interconnected mode of operation.

Preferably there is the further step of passing said first switching signal to an output port of the computer and from said output port to said switching device.

Preferably the first second, third and fourth switching signals are provided by. ON and OFF signals respectively on two lines of said output port.

Preferably said two lines are two lines of a serial output COM port of said computer.

According to a further broad aspect of the present invention there is provided a switching device for use with a computer, and computer software therefor, said switching device permitting two devices connected thereto to be switched into different interconnected modes of operation, said switching device having two switch means, each having respective ON and OFF states, said switching device being responsive to a first switching signal generated by said computer and said software in response to a request for one particular interconnected mode of operation, so said switch means will interconnect said two devices into the one interconnected mode of operation, and where a second switching signal will interconnect said two devices into a second interconnected mode of operation, a third switching signal will interconnect said two devices into a third interconnected mode of operation, and a fourth switching signal will interconnect said two devices into a fourth interconnected mode of operation.

Preferably, said switching device is responsive to ON and OFF signals appearing on two lines of an output port of said computer, said ON and OFF signals, providing the respective first, second, third and fourth switching signals depending on the combinations of ON and OFFs appearing on said two lines as set by said software.

Preferably said two lines are on a serial output COM port of said computer.

BRIEF DESCRIPTION OF THE DRAWINGS

In order that the invention can be clearly ascertained, an example of a preferred embodiment will now be described with reference to the accompanying drawings wherein.

DETAILED DESCRIPTION OF THE PREFERRED EMBODIMENTS

Figure 1:
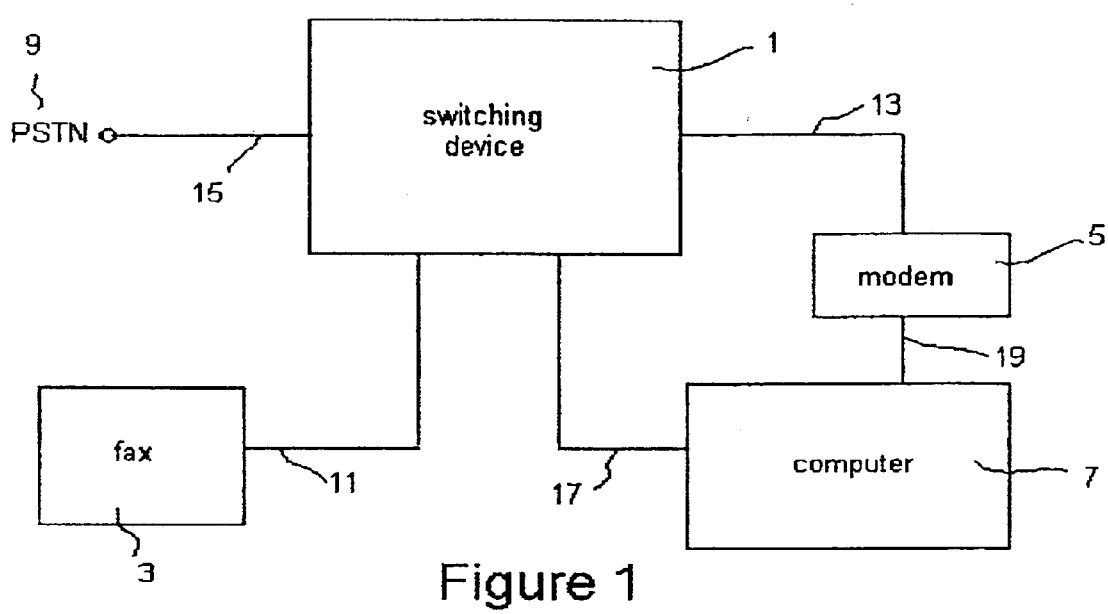
FIG. 1 is a block schematic electrical circuit diagram showing interconnection of an example of the switching device where the external devices are in the form of a fax machine, and a modem.
Figure 2:
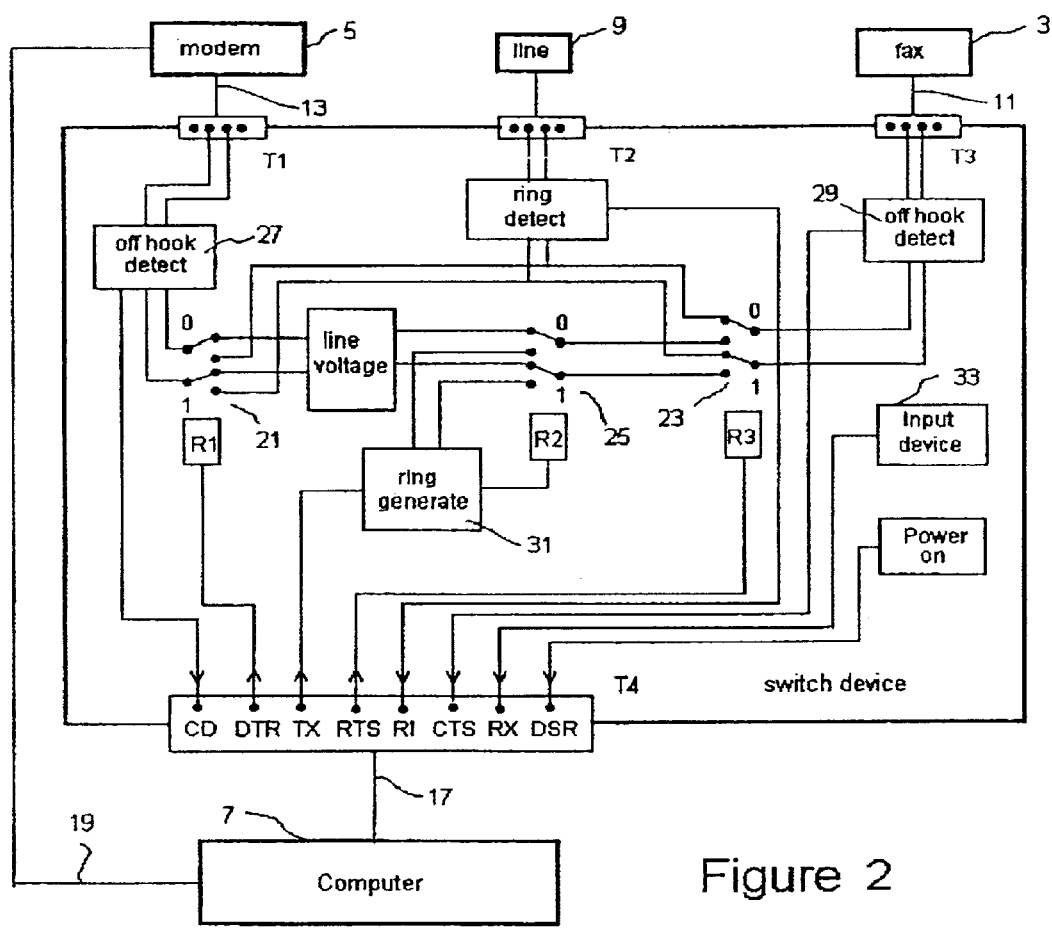
FIG. 2 is a more detailed block circuit diagram of the arrangement shown in FIG. 1
Figure 3:
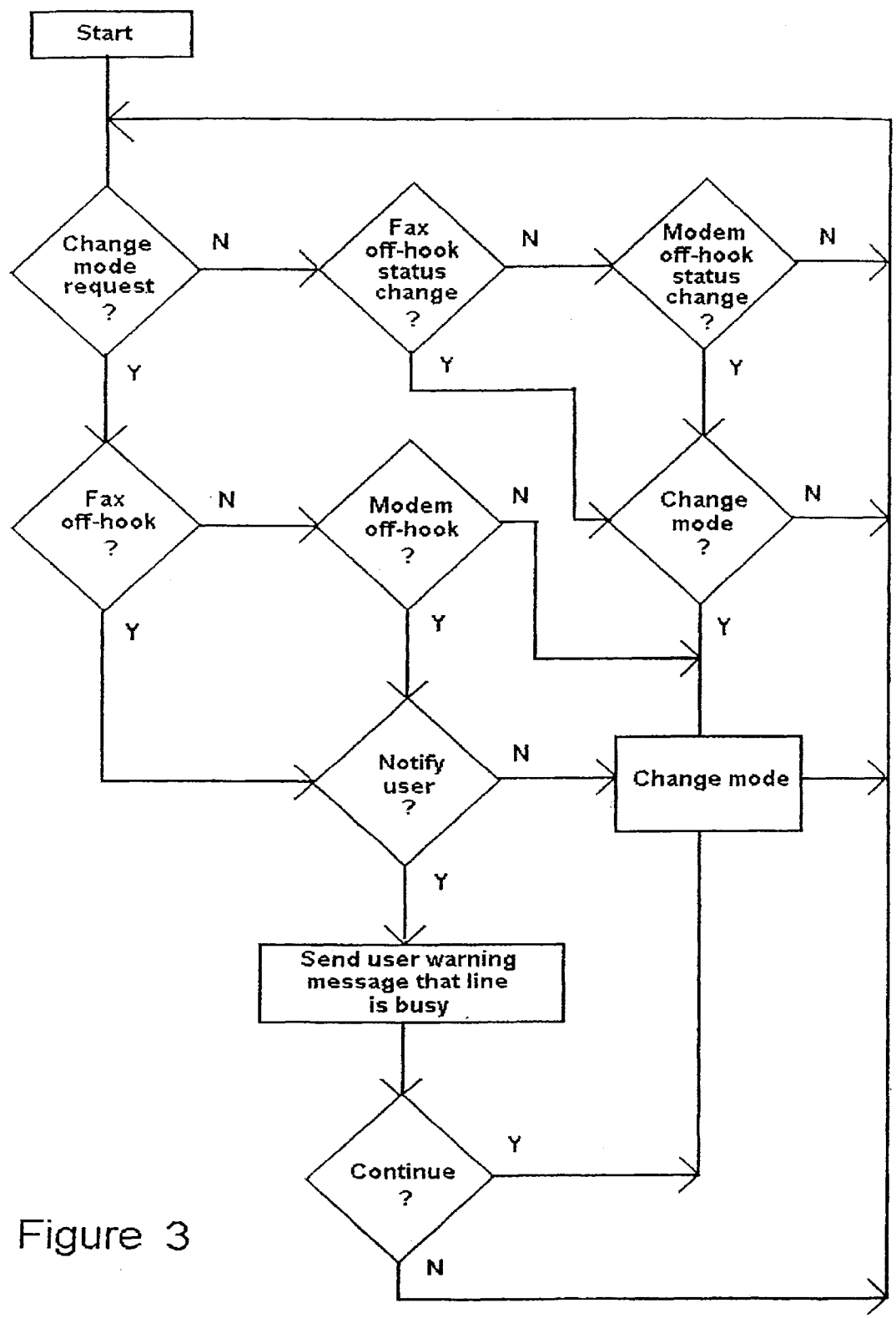
FIG. 3 is a software functional flow diagram for use in the preferred example shown in FIGS. 1 and 2.

In the preferred embodiment shown in FIGS. 1–3 a switching device 1 is used to permit devices in the form of a fax machine 3 and a modem 5 to be interconnected with a computer 7 in the form of a PC. The switching device 1 permits the fax 3 and the modem 5 to be interconnected into four possible interconnected modes of operation. The switching device 1 also connects with an external PSTN telephone line 9.

Software is provided in the computer 7 to permit user interface for selecting the particular interconnected modes of operation of the fax machine 3 and the modem 5.

The switching device 1 has two switch means, which in combination, provide for the four operating modes. Phone line emulation, ring detection and off-hook detection are also provided. A third switch means provides a ring generate feature which is used to activate the fax machine 3 for local transmissions. This will be described in detail in relation to FIG. 2 below.

The two switch means are controlled by reading status information which appears on several input and output control lines of the computer serial communications COM port. In this case, the control signals are not used to provide and control serial communications but to control the two switch means in the switching device to provide for the four interconnected modes of operation of the fax machine 3 and modem 5.

In the communications prior art, data terminal equipment (DTE), or computer, communicates with data communications equipment (DCE), or modem, via an external RS232 port and a 25 pin or 9 pin serial cable, or corresponding internal card COM port equivalents. The function of these pins is as follows:

| Line | Meaning | Function or indication |
| --- | --- | --- |
| CD | Carrier detect | Remote communication established |
| RX | Receive data | Character input to DTE |
| TX | Transmit data | Character output from DTE |
| DTR | Data terminal ready | DTE is powered on |
| GND | Signal ground | Circuit ground |
| DSR | Data set ready | DCE is powered on |
| RTS | Request to send | DCE wants to transmit data |
| CTS | Clear to send | DCE is ready to receive data |
| RI | Ring indicator | Phone ring detected |

In operation, the DCE or DTE sets a voltage on a pin to indicate the relevant signal. Rather than their conventional use in serial data communications, in the example of the preferred embodiment, the signals on some of these pins are used to set the switch means and read status information from the device.

Only two of the available control lines (DTR and RTS) are outputs from the DTE (computer). These may be "ON" or "OFF". Hence there has been a hitherto limited ability to control a device via a serial (COM) port. In the example of the preferred embodiment, both DTR and RTS control the switching means. With the ON-OFF states of the two control lines it is thus possible to define four device modes or switch combinations.

Four of the control lines (CD, DSR, RI and CTS) are inputs and may be read by the DTE and hence by computer software. These may be used to indicate status information to the DTE. In this particular embodiment, it is useful to reserve DSR and RI for their original purposes, indicating respectively that the device is powered ON and the presence of an incoming ring signal. In the preferred embodiment of the invention, CD and CTS are used to indicate off-hook conditions for the modem and fax machine phone terminals. These indicators provide the software with the opportunity to take action in response to user intervention events at the fax machine 3 or the modem 5.

In a further adaptive use of COM port facilities, expanding the limitation imposed by having only two available output control lines, the TX pin, rather than transmitting data, is used to control a third switch means. Unlike DTR and RTS, TX cannot be set to a constant "ON" or "OFF" state. However the presence or absence of the transmission of characters to the port may be used to indicate an "ON" or "OFF" state for the purpose of operating the third switch means.

Furthermore, by continuous transmission of certain data, the TX line may be made to oscillate in a convenient manner. For example, TX may be used, by transmission of suitable character data at a suitable speed, to provide a 40 Hz signal, which when amplified, constitutes a ring signal to the fax machine. It may be used, at the same time to activate a switch means such as a relay switch, that connects the ring voltage to the fax machine. Further elaboration of the use of the TX and RX pins is given below.

In FIG. 1, the connection between the switching device 1 and the fax machine 3 may be a simple telephone line cable 11. The connection between the switching device 1 and the modem 5 may be also via a similar telephone cable 13. The connection to the telephone line may be via a suitable telephone cable 15. The connection between the switching device 1 and the computer 7 may be via a RS232 serial connector cable 17 with appropriate connector. The connection between the modem 5 and the computer 7 may also be via a standard RS232 serial connector cable 19 with appropriate connectors.

Referring now to FIG. 2 it can be seen that the switching device 1 is provided with four connecting terminals T1, T2, T3, and T4. T1, T2 and T3 may be standard RJ11 type phone connectors. T4 may be a standard RS232 serial cable connector. In the preferred example, the switching device 1 has two switch means 21 and 23 that will provide the four possible interconnected modes of operation of the interconnected fax 3 and modem 5. In the preferred implementation there is a further switch means which provides a fifth possible mode of interconnection. Each of the switch means 21, 23 and 25 is operated by respective relays R1, R3 and R2. FIG. 2 shows the switch means 21, 23 and 25 in the power OFF zero state. In this case, the fax machine 3 is connected to the phone line 9. The switch state combinations of zeros or ones being either a voltage ON or OFF on respective control lines of the serial output COM port of the computer 7, provide particular combinations which are used to control switching of the switch means 21, 23 and 25 within the switching device 1. Thus, across all of the switch means 21, 23, 25 there will be a combination of ones or zeros representing ON or OFF switching signals for four possible modes of operation there will be four switching signals. These will, in turn, activate the respective switch means to change state. Preferably, the switch means 21, 23 and 25 are operated by relays R1, R2 and R3, but may be solid state switching devices. The use 25 of relays provides for simplicity of construction.

The following table shows the four possible modes of connection:

| Mode | R1 | R2 | R3 | State |
|------|----|----|----|-------|
| 1 | 1 | 0 | 1 | Modem connected to communication line, fax disconnected. |
| 2 | 0 | 0 | 0 | Fax connected to communication line, modem disconnected. |
| 3 | 0 | 0 | 1 | Modem connected to fax, communication line disconnected. |
| 4 | 1 | 0 | 1 | Both modem and fax connected to communication line |

It can therefore be seen that with the four possible modes of operation, switch means 21 and 23 operate while switch means 25 remains in a zero state. Accordingly, by the use of two control lines from the serial COM port of the computer, providing four switching signals, four possible switching modes can be provided.

A fifth possible mode of operation can be triggered by use of a third control line. In this case, the third control line is the conventional TX control line of the serial output COM port. Switch means 21 and 23 are therefore controlled respectively by the DTR and the RTS control line signals from the serial output COM port of the computer. By providing the third control line and an ON signal on the TX line, the fifth possible mode of operation is set out below.

| Mode | R1 | R2 | R3 | State |
|------|----|----|----|-------|
| 5 (ring on) | 0 | 1 | 1 | Ring generate to fax, modem and fax disconnected from communication line. |

Before setting any of the fax machine 3 or the modem 5 to a changed mode of Interconnected operation the computer may first read the status of the devices and these may be determined on the other control lines of the serial port connector not used for providing the first, second, third or fourth control signals. This may be implemented so that the software within the computer may prevent the fax from accessing the phone line 9 if the phone line 9 is used by the modem 5. Alternatively, it may prevent the modem 5 from accessing the phone line 9 if the fax machine 3 is already accessing the phone line 9. Appropriate Off-hook detect circuits 27 and 29 are connected between the respective first switch means 21 and modem 5, and second switch means 23 and fax machine 3 for this purpose.

In the preferred example, the use of the third switch means 25 is used to switch a ring signal generated from a ring generate circuit 31 to the fax machine 3 to simulate an incoming fax signal to the fax machine 3. In serial communications, each 8-bit character is transmitted bit by bit. The character "U" happens to correspond to the binary sequence 01010101. By continuous transmission of this "U" character, a relatively smooth oscillation can be simulated. This signal, in turn, appears on the TX line and operates the ring generate circuit 31 to provide a ring generate signal. Different frequency ring signals can be provided by using the software to control the data transfer rate at the serial COM port. Thus, by noting the frequency, there can be selective switching frequency detect means in, for example, the ring generate circuit 31, to determine which ring signal frequency is being received. In this way, further switching (not shown) may 30 be implemented to provide further modes of interconnected operation In a similar way, an input device 33 may be used to signal data to the computer 7 through the RX line. In this way, the RX line can be used to read data from a device 33 and this can be used to control functions in the computer 7. In this way, the device 33 can receive characters on the TX line, in the normal way, and then send status information on the RX line.

Referring now to FIG. 3 there is shown a functional flow diagram of the system software loaded in the computer, and used to interact with the switching device 1. The function of the software is two fold—

1. To provide signals to, in turn, appropriately provide for the interconnected modes of operation of the fax machine 3 and modem 5 and
2. To monitor the status of the devices, being the fax machine 3 and the modem 5.

Usually, the software will default to mode 2 previously referred to, connecting the fax machine 3 to the telephone line 9 thus allowing the fax machine 3 to receive incoming calls. If a modem 5 off-hook state is detected this may be interpreted by the software as an attempt by the modem (controlled by other communication software) to use a telephone line 9. In this case the software may switch the device to mode 1, connecting the modem to the telephone line 9 allowing a typical modem call to take place. Following completion of this call, a modem on-hook state will be detected. At this time the software may re-set the device to mode 2 to allow the fax to receive a subsequent call.

The functional flow sequences of FIG. 3 are self evident to a System Software Analyst and can be implemented for operation on computers such as PCs.

Throughout the description of the preferred example, it has been assumed that the device 1 is an external device to the computer 7. It is possible however, to configure the device 1 for internal fitting within the computer by direct connection with the motherboard of the computer.

Further, it is possible to configure the device 1 for connection to the standard USB serial communications port of a computer. In particular, it is possible to configure a PC system so that a USB connection is configured internally within the PC as a serial port. A corresponding USB device may be provided to emulate a serial device. A further embodiment of the invention uses the USB facility in this way to provide the equivalent control functions as those provided by the direct RS232 COM port embodiment.

In a further modification of the invention, the device 1 may be provided with an input keypad or the like for data entry which data is conveyed through the RX line to the computer 7.

In a still further embodiment, the device 1 may be configured internally within a fax machine 3 or a modem 5. In this case appropriate terminals will be provided to effect the necessary interconnections as exemplified by FIGS. 1 and 2. In such cases, a ring generate circuit or part thereof, may not be required. In this case, it may be possible to use the TX line to indicate to the fax machine, internally, rather than via an external ring, that it should enter fax receive mode.

Accordingly, it can be seen that various implementations of device incorporating the inventive concepts may be realised. Further, it can be seen that many different modifications may be made to the actual implementation and these and other modifications may be made without departing from the ambit or scope of the invention the nature of which is to be determined from the foregoing description.

What is claimed is:

1. A method of using a computer and a switching device to switch two devices connected to said switching device into different interconnected modes of operation, said method involving:

a) providing software in the computer permitting interface to request different interconnected modes of operation of said two devices, b) causing a first switching signal to be generated by said software in response to a request for one particular interconnected mode of operation, c) receiving that first switching signal at said switching device and controlling two switch means in said switching device with said first switching signal to provide one of four possible interconnected modes of operation of said two devices, each of said two switch means having respective ON and OFF states, whereby providing a second switching signal will provide a second possible interconnected mode of operation, providing a third switching signal will provide a third possible interconnected mode of operation, and providing a fourth switching signal will provide a fourth possible interconnected mode of operation.

2. A method as claimed in claim 1 wherein following step (b) and prior to step (c) there in the further step of passing said first switching signal to an output port of the computer and from said output port to said switching device.

3. A method as claimed in claim 2 wherein said first second, third and fourth switching signals are provided by ON and OFF signals respectively on two lines of said output port.

4. A method as claimed in claim 3 wherein said two lines are two lines of a serial output COM port of said computer.

5. A method as claimed in claim 3 wherein said two lines are respectively the conventional DTR and RTS control lines of a serial output COM port of said computer.

6. A method as claimed in claim 3 wherein said switching device has a third switch means, using a third line of said output port in combination with said two lines to permit a fifth switching signal to be provided from said software by ON and OFF signals respectively on said three lines to provide a fifth possible mode of operation.

7. A method as claimed in claim 6 wherein said third line is the conventional TX control line of a serial output COM port of the computer.

8. A method as claimed in claim 6 wherein one of said devices is a modem connected to said computer, another of said devices is a fax machine, and wherein a communication line connects with said switching device, and wherein the four possible modes of operation are:

(i) modem connected to said communication line, fax disconnected, (ii) fax connected to said communication line, modem disconnected, (iii) modem connected to fax, said communication line disconnected, (iv) both modem and fax connected to said communication line.

9. A method as claimed in claim 8 wherein said third line is used to activate a "ring generate signal" to permit the following mode of operation:

(v) ring generate to fax, modem and fax disconnected from said communication line.

10. A method as claimed in claim 4 and using control lines of said serial output COM port not used to provide said first or said second switching signal, to monitor the status of the connected devices, and using the computer to monitor those control lines to determine the status of those devices.

11. A method as claimed in claim 3, and causing said software to forward a repeating code signal on one of the control lines, and using that repeating code signal to generate a "ring signal".

12. A method as claimed in claim 11, and causing said software to control the data transfer rate of the one of the control lines to control the frequency of the "ring signal".

13. A method as claimed in claim 12, and operating frequency detect means in said switching device to detect different frequencies of said "ring signal" and to switch the switch device for a further possible mode of operation in response thereto.

14. A switching device for use with a computer, and computer software therefor, said switching device permitting two devices connected thereto to be switched into different interconnected modes of operation, said switching device having two switch means, each having respective ON and OFF states, said switching device being responsive to a first switching signal generated by said computer and said software in response to a request for one particular interconnected mode of operation, so said switch means will interconnect said two devices into the one interconnected mode of operation, and where a second switching signal will interconnect said two devices into a second interconnected mode of operation, a third switching signal will interconnect said two devices into a third interconnected mode of operation, and a fourth switching signal will interconnect said two devices into a fourth interconnected mode of operation.

15. A device as claimed in claim 14 wherein said switching device is responsive to ON and OFF signals appearing on two lines of an output port of said computer, said ON and OFF signals providing the respective first, second, third and fourth switching signals depending on the combinations of ON and OFFs appearing on said two lines as set by said software.

16. A device as claimed in claim 15 wherein said two lines are on a serial output COM port of said computer.

17. A device as claimed in claim 16 wherein said device has a serial COM port connector permitting serial port connection with said computer.

18. A device as claimed in claim 17 wherein said devices are intended for parallel output COM port connection with a computer and said device has two parallel COM port connectors permitting said devices to be operatively connected to said switching device.

19. A device as claimed in claim 18 wherein said devices are intended to be a fax machine and a modem.

20. A device as claimed in claim 18 including a third switch means and wherein a third line of said output port is used to provide a fifth switching signal and wherein said first switch means, said second switch means and said third switch means provide a fifth possible interconnected mode of operation of said devices.

21. A device as claimed in claim 18 wherein a connector is provided for a communication line to connect with said device, and wherein said four possible modes of operation are:

(i) modem connected to said communication line, fax disconnected, (ii) fax connected to said communication line, modem disconnected, (iii) modem connected to fax, said communication line disconnected, (iv) both modem and fax connected to said communication line.

22. A device as claimed in claim 18 including a third switch means and wherein a third line of said output port is used to provide a fifth switching signal and wherein said first switch means, said second switch means and said third switch means provide a fifth possible interconnected mode of operation of said devices, and wherein said fifth switching signal is used to activate a "ring generate" means in said device to, in turn, provide a ring generate signal to said fax machine and to permit the fifth interconnected possible mode of operation to be provided, said device having a connector to provide for a communication line to connect with said device, and wherein said fifth possible mode of operation is:

ring generate to fax, modem and fax disconnected from said communication line.

23. A device as claimed in claim 22 wherein said "ring generate" means is responsive to the frequency of the fifth switching signal, and will switch the device for a further possible interconnected mode of operation, in response to a different frequency of the fifth switching signal, said frequency being determined by said software switching the data transfer rate of the output COM port of the computer to the required rate for the different frequency of the fifth switching signal.

24. A device as claimed in claim 16 wherein said device interconnects with said devices, so that control lines of said serial output COM port not used to provide said switching signals, permit status information of said devices to pass through said switching device and permit the status of the interconnected devices to be determined.

\* \* \* \* \*